Aug. 12, 1941.   G. E. CAMPBELL   2,252,618
ROTARY MACHINE
Original Filed May 6, 1936
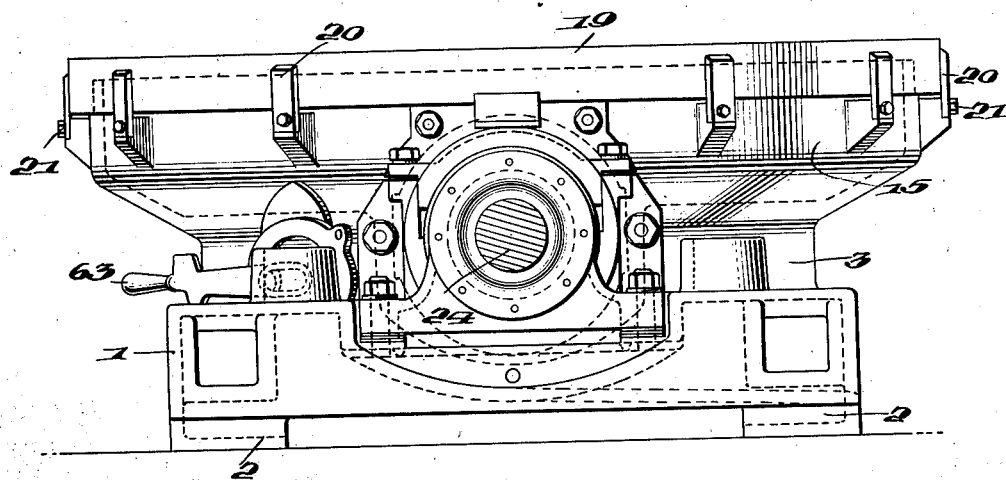
Inventor
George E. Campbell
By Vernon E. Hodges
H. Hamlin Hodges his Attorneys Patented Aug. 12, 1941

2,252,618

UNITED STATES PATENT OFFICE 2,252,618

ROTARY MACHINE

George E. Campbell, Chattanooga, Tenn., assignor to The Wheland Company, Chattanooga, Tenn., a corporation of Tennessee Original application May 6, 1936, Serial No. 78,276. Divided and this application March 9, 1939, Serial No. 260,860

2 Claims. (Cl. 255—23)

This invention relates to an improvement in rotary machines of the type employed in the drilling of oil wells, and more particularly to a rotary machine which is fully enclosed and is so constructed as to withstand the severe shocks imposed upon present-day well drilling apparatus. The present application is a division of my application Serial No. 78,276, filed in the U. S. Patent Office, May 6, 1936.

Another object of this invention is to improve the construction of the rotary machine, to simplify its construction, and to enable it to operate successfully with a minimum of care and to withstand the severe shocks imposed upon the rotary in well drilling operation.

Another improved feature of this rotary is the ring gear locking device which makes provision for direct locking of the ring gear to the base, which simplifies the pinion shaft assembly and removes from the pinion bearings all shocks incident to locking. A locking pin is slidably mounted in the base in position to be raised into meshing engagement with the teeth of the ring gear for locking the ring gear and table against rotation.

In the accompanying drawing:

Fig. 1 is an end elevation of my improved rotary machine showing the drive shaft in section;

Fig. 2 is a vertical sectional view of my improved ring gear locking device on line 4—4 of Fig. 4;

Fig. 3 is a fragmentary view in end elevation of the locking device partly in section; and Fig. 4 is a fragmentary plan view of a portion of the rotary machine showing a desirable position of the locking device as applied to the rotary machine.

As indicated in the accompanying drawing, the base of the rotary machine is designated generally by the numeral 1, and is of one-piece construction to mount and support the parts of the rotary machine. The base 1 is supported upon the usual longitudinally extending skids 2, which extend throughout the entire length of the machine, said skids being formed integral with the base, and being L-shaped in cross-section, as shown in dotted lines in Fig. 1.

The base 1 has an upstanding flange 3 of annular shape and carrying an annular bearing raceway. The raceway is formed by means of an annular bottom wall 5 from which inner and outer bearing retaining flanges 6 and 7 extend upwardly, being spaced apart horizontally to define the bearing raceway. Seated in the raceway is a bearing ring 8 having bearings 9, mounted and operating therein. A cooperating bearing ring 10 rides upon the bearings 9, and has a depending flange 11 vertically telescoping the upper edge of the outer flange 7. The race ring 10 supports the rotary table 12 which is mounted thereon.

The upper edge of the wall 15 is embraced by a depending flange 18 formed on the periphery of the table 12, to prevent the ingress of foreign matter, such as mud, water, and the like, into the rotary machine or the gear lubricant chamber 16. Spaced radially from the table 12 is a guard ring 19 carried by a plurality of upstanding lugs 20 secured by bolts or screws 21 to the periphery of the wall 15. This guard ring 19 protects the table from injury and protects the operator from the rotation of the table.

The table 12 carries the usual ring gear 22 which operates in the gear chamber 16 and meshes with a pinion 23 mounted on the inner end of the pinion shaft 24. The pinion 23 dips into the oil sump 17, so as to receive a bath of oil or lubricant and to transfer said lubricant to the ring gear 22, from which any lubricant dripping off will be drained back into the sump through the annular chamber 16.

Provision is made for locking the ring gear and table against rotation, for which purpose a plunger 55 is slidably mounted in a vertical guide 56 in the base 1 and is provided with a tooth 57, on its upper end to engage between the teeth of the ring gear 22. This construction is shown more clearly in Figs. 2 and 3. The plunger 55 is provided with a transverse slot 58 therein intermediate its ends and at one end of the slot 58, the plunger is notched out as at 59 to receive a cam 60 which operates in this notch 59.

The cam 60 is fixed on a cam shaft 61 extending transversely through the slot 58 in the plunger and having one end thereof journaled in the base 1, beside the guide 56, while the other end of the cam shaft 61 is journaled in a bearing 62 secured to the base 1.

The free end of the cam shaft 61 carries a lever 63 for turning the shaft 61 and cam 60 in order to reciprocate the plunger 55 vertically into and out of engagement with the teeth of the ring gear 22. The lever 63 swings between the positions shown in Figs. 2 and 3, and Fig. 4, Fig. 4 representing the position of the lever when the plunger is lowered out of engagement with the ring gear, and Figs. 2 and 3 representing the position of the lever when the plunger is in engagement with the ring gear.

This forms an effective lock for the ring gear and table which makes it unnecessary to have a locking device associated with the pinion shaft assembly and thereby simplifies the latter while at the same time removing all shocks incident to locking from the pinion bearings.

The rotary machine is operated in the customary manner, power being applied through the usual sprocket chain (not shown) to the shaft 24, pinion 23, and ring gear 22, and thereby turning the table 12 on the bearings 9. During such operation, the lever 63 will be in the position shown in Figs. 1 and 4, with the plunger 55 lowered out of engagement with the ring gear 22, but, when it is desired to lock the table in a stationary position, the plunger 55 is raised as shown in Figs. 2 and 3.

I claim:

1. In a rotary machine, the combination of a base, a table rotatably supported on the base and having a ring bevel gear therebeneath, the teeth of which extend downwardly, a bevel gear drive located beneath the ring bevel gear and having its teeth geared to the teeth of the ring bevel gear, a guide in the base extending approximately vertically at a point beneath the ring bevel gear, and substantially perpendicular to the base and table and located between the two, the table extending over and covering the ring bevel gear and the upper end of the vertical guide, the table having a depending overlapping flange on its periphery for preventing the ingress of foreign matter such as mud, water, and the like into the rotary machine, a plunger fitted to and slidably mounted in the vertical guide and provided with a tooth on its upper end in position to engage between teeth of the ring-gear from beneath, and means for positively sliding the plunger up and down in the vertical guide whereby to lock or unlock the table and base together.

2. In a rotary machine, the combination of a base, a table rotatably supported on the base and having a ring bevel gear therebeneath the teeth of which extend downwardly, a bevel gear drive located beneath the ring bevel gear and having its teeth geared to the teeth of the ring bevel gear, a guide in the base and extending approximately vertically at a point beneath the ring bevel gear, and approximately perpendicular to the base and table and located between the two, the table extending over and covering the ring bevel gear and the upper end of the vertical guide, the table having a depending overlapping flange on its periphery for preventing the ingress of foreign matter such as mud, water, and the like into the rotary machine, a plunger fitted to and slidably mounted in the vertical guide and provided with a tooth on its upper end in position to engage between teeth of the ring-gear from beneath, a cam shaft having a cam thereon, said cam constructed and adapted to enter and turn in a recess in the plunger, whereby to positively move the tooth on the plunger in or out of engagement with the teeth of the ring-gear, and a means for turning the cam shaft and cam to move and lock the plunger.

GEORGE E. CAMPBELL.